United States Patent
Yang

(10) Patent No.: US 10,845,040 B2
(45) Date of Patent: Nov. 24, 2020

(54) DESK LAMP

(71) Applicant: SHENZHEN ROYOLE TECHNOLOGIES CO., LTD., Shenzhen (CN)

(72) Inventor: Fan Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/648,152

(22) PCT Filed: Sep. 20, 2017

(86) PCT No.: PCT/CN2017/102450
§ 371 (c)(1),
(2) Date: Mar. 17, 2020

(87) PCT Pub. No.: WO2019/056207
PCT Pub. Date: Mar. 28, 2019

(65) Prior Publication Data
US 2020/0232628 A1 Jul. 23, 2020

(51) Int. Cl.
*F21S 6/00* (2006.01)
*F21V 21/26* (2006.01)
(Continued)

(52) U.S. Cl.
CPC .......... *F21V 21/26* (2013.01); *F21V 33/0004* (2013.01); *G06F 3/017* (2013.01);
(Continued)

(58) Field of Classification Search
CPC ...... F21V 21/26; F21V 33/0004; F21S 6/003; G06F 3/0488; G06F 3/017; H05B 45/10
(Continued)

(56) References Cited

U.S. PATENT DOCUMENTS

2017/0097141 A1* 4/2017 Hyodo .................... G06F 3/017
2018/0003371 A1* 1/2018 Hsieh .................. F21V 23/0485

FOREIGN PATENT DOCUMENTS

| CN | 203363813 U | 12/2013 |
|---|---|---|
| CN | 103987169 A | 8/2014 |
| WO | 2013169635 A1 | 11/2013 |

OTHER PUBLICATIONS

International Search Report issued in corresponding International Application No. PCT/CN2017/102450, dated Jun. 27, 2018, pp. 1-2, State Intellectual Property Office of the P.R. China, Beijing, China.

* cited by examiner

*Primary Examiner* — Karabi Guharay
(74) *Attorney, Agent, or Firm* — Hauptman Ham, LLP

(57) ABSTRACT

A desk lamp including a base, a bracket, a lamp body, a flexible touch screen, and a control device that controls the desk lamp to work in a working mode including a first mode and a second mode. When the desk lamp is in the first mode, the control device controls the flexible touch screen to sense a first distance touch. When the desk lamp is in the second mode, the control device controls the flexible touch screen to sense a second distance touch. The desk lamp has the first mode and the second mode. The desk lamp may be controlled to work in a corresponding working mode as needed by sensing the first and second distance touches using the flexible touch screen, and by responding to the sensing signal using the control device.

19 Claims, 6 Drawing Sheets

(51) Int. Cl.
*F21V 33/00* (2006.01)
*H05B 45/10* (2020.01)
*G06F 3/044* (2006.01)
*G06F 3/0488* (2013.01)
*G06F 3/01* (2006.01)

(52) U.S. Cl.
CPC ............ *G06F 3/044* (2013.01); *G06F 3/0488* (2013.01); *H05B 45/10* (2020.01); *G06F 2203/04102* (2013.01)

(58) Field of Classification Search
USPC ........................................................ 362/427
See application file for complete search history.

DESK LAMP

RELATED APPLICATION

The present application is a National Phase of International Application Number PCT/CN2017/102450, filed Sep. 20, 2017.

TECHNICAL FIELD

Aspects of the present disclosure relate to technologies of lamps. More specifically, certain implementations of the present disclosure relate to a desk lamp.

BACKGROUND

Turning on and off of current desk lamps and adjusting the brightness and color temperature of the light sources of the desk lamps can only be achieved by turning a knob or directly touching touch keys. And people use light sources in a variety of situations. It is easier to operate to turned on the light during daytime, however, when it is dark at night, it needs to grope around to find the switch and adjustment area of the desk lamp. In addition, the moment the desk lamp is turned on by a switch, the brightness of the space changes suddenly, which is extremely dazzling for people who have been adapted to the dark environment, thereby causing people to feel uncomfortable, and it will also drive away people's sleepiness, which is not good for human health.

SUMMARY

Technical Problems the purpose of the embodiments of the present disclosure is to provide a desk lamp, which aims to solve the technical problems of poor adaptability of a traditional desk lamp to the application environment, especially the inconvenience of manipulation in a dark environment and the instantaneous change in brightness when the desk lamp is turned on, which causes sensory discomfort.

Technical Solution in order to solve the technical problems, the embodiments of the present disclosure are implemented as: a desk lamp, including a base, a bracket connected to the base, a lamp body connected to the bracket, a flexible touch screen provided on the base, the bracket, or the lamp body, and a control device operative to control the desk lamp to enter a working mode and operate in the working mode; the working mode includes at least a first mode and a second mode; when the desk lamp is in the first mode, the control device controls the flexible touch screen to sense a first distance touch by human body; when the desk lamp is in the second mode, the control device controls the flexible touch screen to sense a second distance touch by human body.

Technical Benefits the desk lamp provided by the embodiment of the present disclosure has the following beneficial effects: the desk lamp has two working modes including a first mode and a second mode, where the first distance touch and the second distance touch are sensed by a flexible touch screen, and the sensing signal is responded to by a control device in order to control the desk lamp to work normally in a corresponding working mode. One can set the working mode suitable for different environments and the corresponding touch distances according to the needs, that is, one can set a working mode for the dark environment and another working mode for the bright environment, and set correspondingly long and short touch distance. For example, at night, a user simply needs floating operation without touching the desk lamp, and the desk lamp may be lighted conveniently. And the brightness may be set in the first mode and the second mode to avoid a sudden change of brightness when the light is turned on at night, which can keep the user from sensory stimuli and sleepiness loss and help the user be healthy.

BRIEF DESCRIPTION OF THE DRAWINGS

In order to more clearly explain the technical solution of the present disclosure, the embodiments or the prior art will be briefly described below with reference to the accompanied drawings. It is noted that the accompanied drawings merely refer to some embodiments of the present disclosure, and one with ordinary skills in the art may acquire other drawings based on these drawings without creative efforts.

REFERENCE NUMBERS IN THE DRAWINGS

Figure 1:
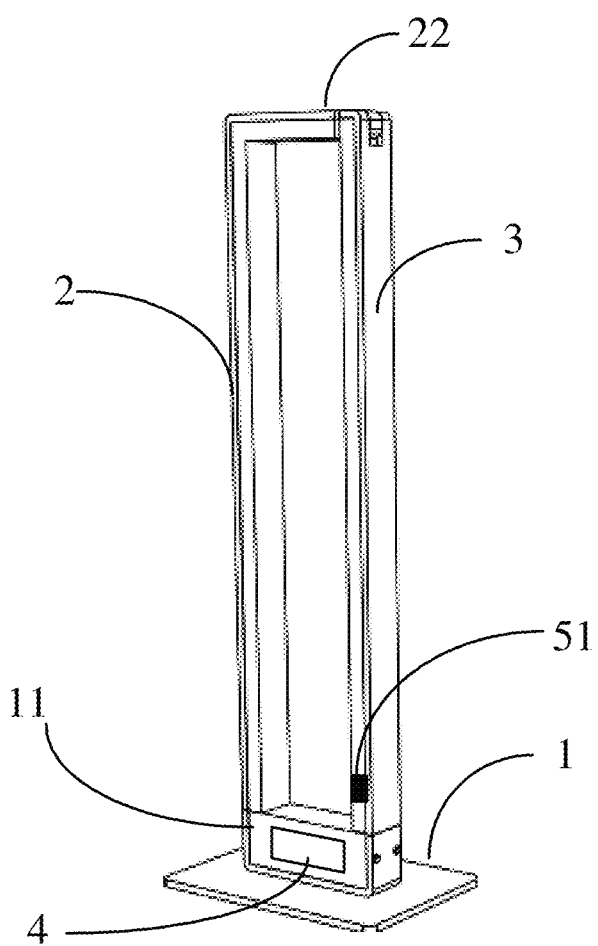
FIG. 1 is a structural schematic diagram of a desk lamp when a lamp arm is in the closed state in accordance with the embodiments of the present disclosure.

1—base; 2—bracket; 3—lamp body; 4—flexible touch screen; 5—control device;

11—block structure; 21—rod body; 22—turning shaft; 31—lamp arm; 32—light-emitting element; 51—mode selection module; 52—work control module;

511—sensor; 512—module selection unit; 513—first conductive contact; 514—second conductive contact; 515—light sensor.

DETAILED DESCRIPTION

In order to make the objectives, technical solutions, and advantages of the present disclosure clearer, the present disclosure is further described in details below with reference to the accompanying drawings and embodiments. It should be understood that the specific embodiments described herein are only used to explain the present disclosure and are not intended to limit the present disclosure.

It should be noted that when a component is called "fixed to" or "disposed to" another component, it may be directly or indirectly on the other component. When a component is referred to as being "connected to" another component, it can be directly or indirectly connected to the other component. The orientations or positional relationships indicated by the terms "up", "down", "left", "right" and the like are based on the orientations or positional relationships shown in the drawings, and are for convenience of description only, and do not indicate or imply that the device or the element referred to must have a specific orientation, be constructed and operate in a specific orientation, and therefore cannot be understood as a limitation. The terms "first" and "second" are only used for convenience of description, and cannot be understood as indicating or suggesting relative importance or implicitly indicating the number of technical features. The meaning of "plurality" means two or more, unless specifically defined otherwise.

Figure 2:
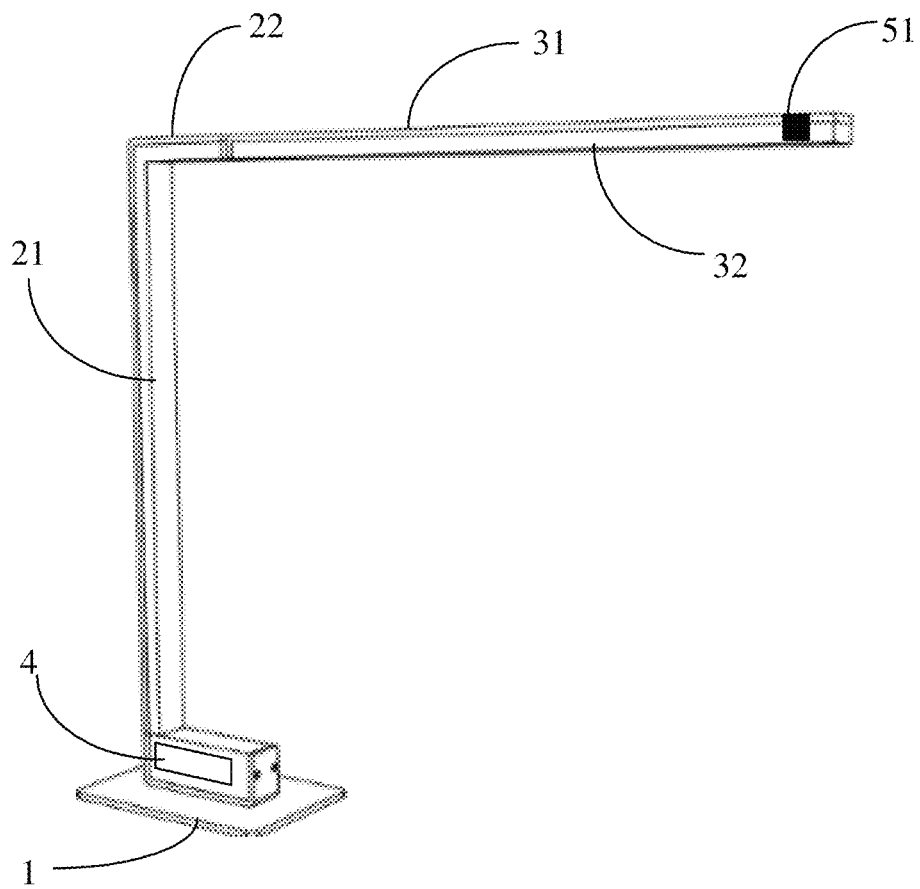
FIG. 2 is a structural schematic diagram of a desk lamp when a lamp arm is in the open state in accordance with the embodiments of the present disclosure.
Figure 6:
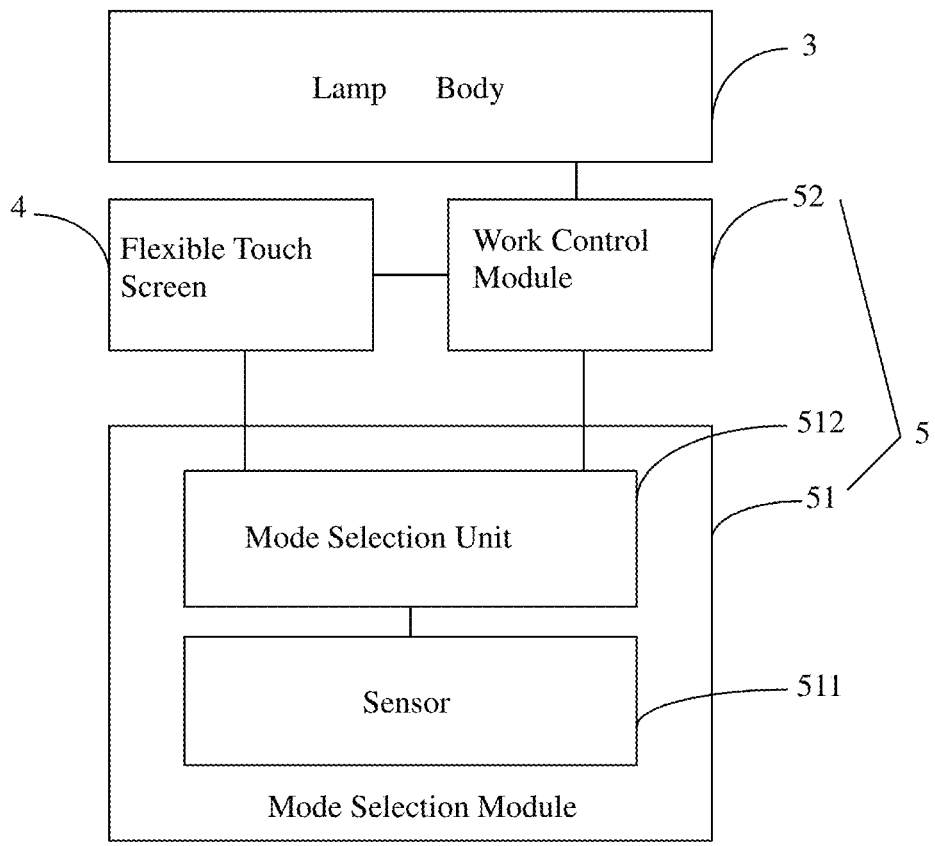
FIG. 6 is a schematic diagram of work modules of a desk lamp in accordance with the embodiments of the present disclosure.

In order to explain the technical solution of the present disclosure, detailed description is given below with reference to specific drawings and embodiments. Please refer to FIG. 1, FIG. 2 and FIG. 6. The embeddings of the present disclosure provide a desk lamp, including a base 1, a bracket 2 connected to the base 1, a lamp body 3 connected to the bracket 2, and a flexible touch screen 4 provided on the base 1, bracket 2, or lamp body 3, and a control device 5 that controls the desk lamp to enter any working mode and work in that working mode. That is, the functions of the control device 5 specifically include two aspects, one is to put the desk lamp in a certain working mode according to a set scheme, the other is to enable desk lamp to sense touch and respond in this working mode. The working mode of desk lamp includes at least a first mode and a second mode. When the desk lamp is in the first mode, the control device 5 controls the flexible touch screen 4 to sense the first distance touch of the human body. When the desk lamp is in the second mode, the control device 5 controls the flexible touch screen 4 to sense the second distance touch of human body.

Compared with traditional desk lamps, the desk lamp provided by the present disclosure has two working modes including a first mode and a second mode. The flexible touch screen senses the first distance touch and the second distance touch, and the control device responds to the sensing signal. In order to control the desk lamp to work normally in the corresponding working mode, one can set the working mode suitable for different environments and the corresponding touch distances according to needs. For example, one can set a working mode when the environment is dark and a working mode when the environment is bright, and correspondingly set long and short touch distances. As such, at night, users can turn on the lamp without touching the desk lamp by floating operation, and it is easy to use; one can also in the first mode and the second mode set the brightness of the light to avoid the sudden change of brightness when the light is turned on at night, thereby avoiding the stimulation of the user's senses and driving away drowsiness, which is beneficial to health.

Specifically, different working modes can be set according to needs to adapt to different application environments. The more common application scenarios are bright and low light environments. For example, one may set the first mode to night light mode for night and the second mode to bright light mode for day. In night light mode, the first distance touch includes long-distance floating touch, short-distance floating touch, and can further include contact touch, and the lamp body is turned on in low light form to avoid glare; in bright light mode, the second distance touch includes short-distance floating touch and contact touch, and the lamp body is turned on in a bright light form. Among them, bright light and low light are relative concepts, and their specific brightness values do not need to be strictly limited. Bright light is mainly used when the ambient light is bright, and low light is mainly used when the ambient light is dark, such as at night, to prevent the moment of turning on the light to cause a sudden change in brightness.

It can be understood that the specific distances of the above long-distance floating touch and short-distance floating touch do not need to be strictly limited. Long distance and short distance are relative concepts. Long distance touch is mainly used in dark environments where it is not convenient to quickly touch the desk lamp. Normally the distance ranges from a few centimeters to tens of centimeters. The maximum distance is limited by the sensing distance limitation of the floating touch technology. At the same time, one may also consider the situation of wrong lighting at night. That is, a long-distance touch action is sensed and the desk lamp is turn on when a user does not wish to light up. The distance setting for short-distance floating touch can be determined based on market research results or for end-use requirements, such as 0~20 cm.

In this embodiment, the flexible touch screen 4 is a capacitive touch screen. The principle of implementing a floating touch using the capacitive touch screen 4 is to detect a change in capacitance of the capacitive touch screen to sense a touch action; the detection sensitivity in the first mode is first sensitivity, the detection sensitivity in the second mode is second sensitivity, and the first sensitivity is higher than the second sensitivity. The floating touch distance applicable to the first mode is greater than the floating touch distance applicable to the second mode, thereby making the first mode more suitable for nighttime and the second mode more suitable for daytime.

In this embodiment, the sensing section of the flexible touch screen 4 is preferably a 4π solid angle space centered on the sensing portion of the flexible touch screen 4. That is, the flexible touch screen 4 can sense the touch of the entire surrounding space, and users can control the desk lamp by touching from any direction, which is more convenient to use.

In this embodiment, according to the function of the control device 5, that is: one is to put the desk lamp in a certain working mode, and the other is to make the desk lamp be able to sense touch and respond in the working mode. It usually includes at least two work modules, namely mode selection module 51 and work control module 52. The mode selection module 51 is used to enable the first mode or the second mode of the desk lamp, and the work control module 52 is used to control the desk lamp to normally work in the first mode or the second mode. The mode selection module 51 can be electrically connected to one or both of the flexible touch screen 4 and the work control module 52, and is specifically designed according to the mode selection and the work control manner.

Specifically, the mode selection module 51 can determine in which working mode the desk lamp should be in a variety of ways (detailed in the subsequent embodiments), and enable the corresponding working mode of the desk lamp. The specific opening manner can be controlling the signal scanning distance of the flexible touch screen 4, for example, controlling its ability to scan long-distance floating touch actions, or its ability to scan short-distance floating touch actions, or its ability to scan long and short distance floating touch actions, and so on. During the day, one can control the corresponding circuit of the flexible touch screen 4 so that it can only scan short-distance floating touch or contact touch, and at the same time design the work control module 52 to turn on the brightness (brighter) in bright light mode. At night, one can change the circuit so that it can scan both long-distance floating touch and short-distance floating touch and contact touch. At the same time, one can design the work control module 52 to turn on the light (darker) in night light mode. This will enable the corresponding bright light mode and night light mode. Of course, there are other ways to enable working mode. In addition, the work control module 52 must be electrically connected to at least the flexible touch screen 4 and the circuits of the lamp body 3, so that it can receive the scanning or detection signal of the flexible touch screen 4 and control the desk lamp to be turned on and adjust the brightness and color temperature according to the signal. Further, the work control module 52 controls the light state according to the detection results of the flexible touch screen 4 on the first distance touch and the second distance touch, and the light state includes light on and off, light brightness, and color temperature.

Figure 7:
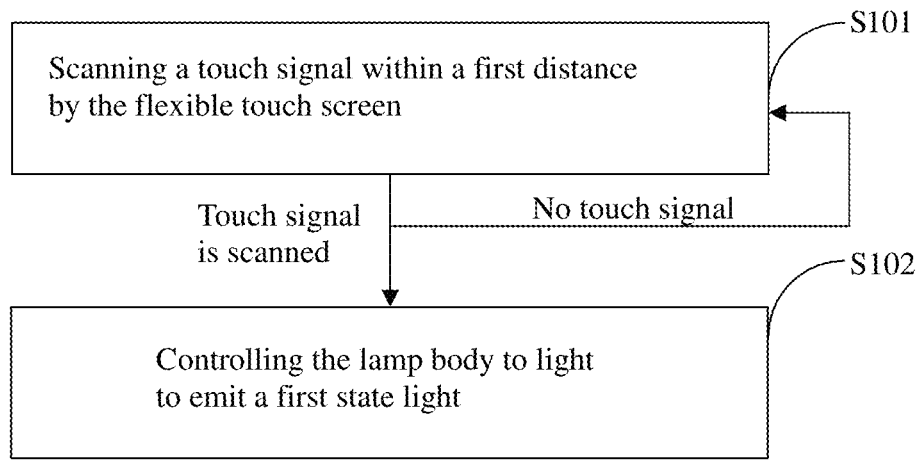
FIG. 7 is a flowchart diagram of a first mode of a desk lamp in accordance with the embodiments of the present disclosure.
Figure 8:
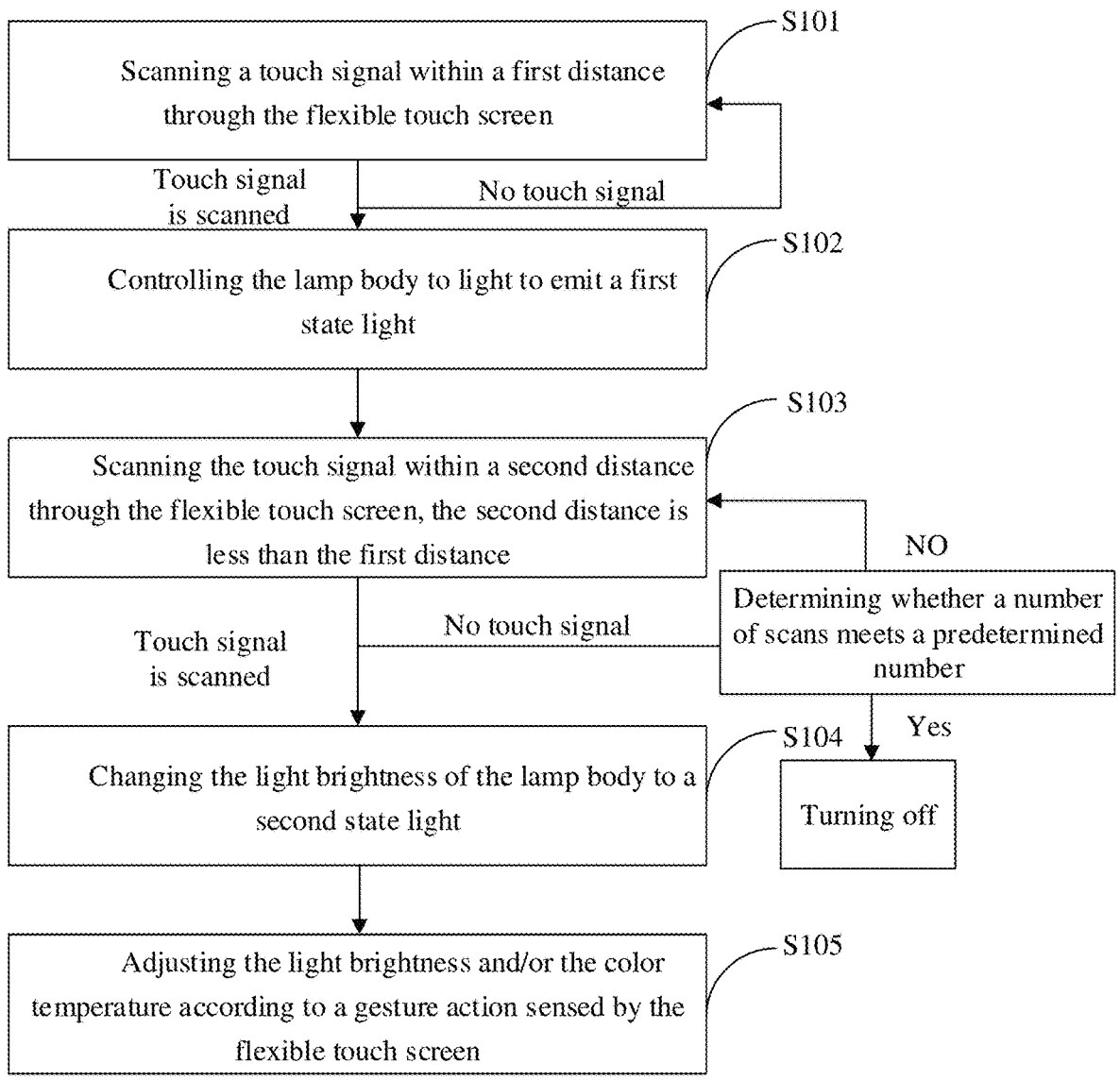
FIG. 8 is a flowchart diagram of a first mode of a desk lamp in accordance with the embodiments of the present disclosure.

Referring to FIG. 7 and FIG. 8, specifically in the first mode, various parts of the desk lamp operate as:

S101: a touch signal is scanned within a first distance by the flexible touch screen 4; when the touch signal is scanned, S102 is performed; when the touch signal is not scanned, the S101 is repeated;

S102: the lamp body is controlled to light to emit a first state light.

In this embodiment, when the first mode is night light mode, the first distance is a long distance, which is a preset value, usually a few centimeters to several tens of centimeters. The purpose is that the user can turn on at a relative long distance from the lamp. It does not need to touch the switch accurately to facilitate night use. The first state light is preferably low light.

Further, the following steps is included after S102:

S103: the touch signal is scanned within a second distance by the flexible touch screen 4; the second distance is less than the first distance; when the touch signal is scanned, S104 is performed; when the touch signal is not scanned, S103 is repeated;

S104: the light brightness of the lamp body is changed to a second state light.

Further, in S103, when the touch signal is not scanned, whether scans have been performed for a predetermined number is determined; if yes, the light is turned off, otherwise S103 is repeated.

Further S105 is included after S104: the light brightness and/or the color temperature is adjusted according to a gesture action sensed by the flexible touch screen.

The second distance is a short distance and a preset value, which is usually 0~20 cm and contains 0, which includes the case where it contacts the desk lamp. The purpose of setting the second distance is to meet the user's needs to adjust the brightness and color temperature. If the user has this demand, the user will get closer to the desk lamp to touch it, and the flexible touch screen 4 can scan the signal within the second distance, and then change the light brightness of the lamp body to the second state light. The second state light can be adjusted to increase or decrease the brightness, and the color temperature of the light can also be adjusted by the corresponding gesture action. If the user triggers by mistake, at this time, the flexible touch screen 4 cannot scan the signal within the second distance. When there is no signal after setting the number of scans, the work control module 52 will control the desk lamp to be turned off.

The desk lamp adjusts light brightness and/or color temperature according to the one-finger movement, one-finger pausing, two-finger movement, and two-finger pausing sensed by the flexible touch screen. The gesture design of the user can be as follows: the first type is to adjust the light brightness with one finger, and adjust the color temperature with two fingers. For example, swiping clockwise increases the brightness and swiping counterclockwise decreases the brightness, or swiping up increases the brightness and sliding down decreases the brightness. Two fingers are relatively separated to increase the color temperature and relatively close to decrease the color temperature, or are relatively separated to decrease the color temperature and relatively close to increase the color temperature. The second type is to use one-finger pausing to adjust the brightness, and two-finger pausing to adjust the color temperature. For example, a single finger is placed in the detection area for a period of time. When the brightness reaches the required value, one may remove the finger, and two fingers continue to stay until the color temperature reaches the needs to stop. The third type is to adjust the color temperature with one finger, and adjust the brightness with two fingers. The fourth type is to use one-finger pausing to adjust the color temperature, and two-finger pausing to adjust the brightness. Correspondences between other actions and brightness color temperature can also be set, and this embodiment will not describe them one by one.

Figure 9:
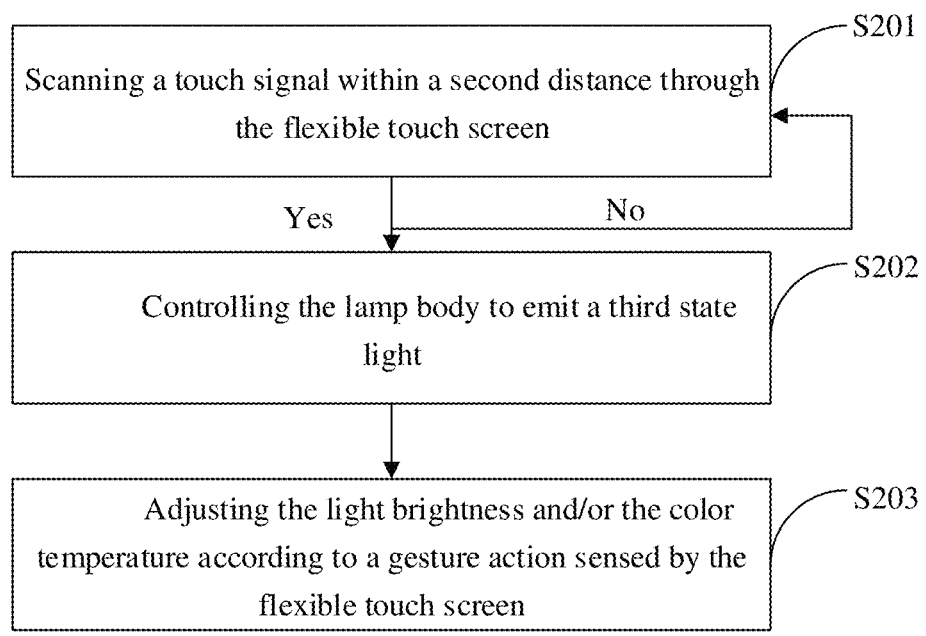
FIG. 9 is a flowchart diagram of a second mode of a desk lamp in accordance with the embodiments of the present disclosure.

Referring to FIG. 9, in the second mode, various parts of the desk lamp work as:

First, S201 is performed: a touch signal is scanned within a second distance by the flexible touch screen; when the touch signal is scanned, S202 is performed; when the touch signal is not scanned, S201 is repeated;

The second distance belongs to the above-mentioned short distance, and is a preset value, which can be 0~20 cm. When the second mode is bright light mode, no long-distance touch is required, so only the near-range touch function can be set.

S202: the lamp body is controlled to emit a third state light. This step does not need to use low light form to illuminate the lamp body 3, because the bright light mode has strong ambient light, it can be directly turned on with brighter light, and its specific brightness value can be based on the normal brightness of the ordinary desk lamp, limit. Of course, in some special occasions, one can also set the third state light to a brighter light.

Further S203 is included after S202: the light brightness and/or the color temperature is adjusted according to a gesture action sensed by the flexible touch screen 4. In bright light mode, users can also adjust the brightness and color temperature of the desk lamp by preset gestures. For easy design and operation, direct contact touch can be used. The specific gesture adjustment method is as described in the first mode embodiment, and is not repeated here.

Further, this embodiment provides a desk lamp of a specific shape and structure, as shown in FIG. 1 through FIG. 5. The base 1 of the desk lamp is plate-shaped. A block structure 11 supporting bracket 2 is provided on the base 1. It can be used to assemble various circuit control devices of the desk lamp, such as the work control module 52 described above. Corresponding lines are routed to the lamp body 3 and the flexible touch screen 4 by the bracket 2. The lamp body 3 includes a lamp arm 31 and a light-emitting element 32 provided on the lamp arm 31. The lamp arm 31 is rotatably connected to the bracket 2, so that the lamp arm 31 is in an open state or a closed state with respect to the bracket 2. More specifically, the bracket 2 includes a rod body 21 that is perpendicular to the base 1 and a turning shaft 22 that is bent vertically from the top end of the rod body 21. The rod body 21 and the turning shaft 22 are hollow, which is convenient for accommodating lines. The length of the turning shaft 22 is far smaller than the length of the rod body 21, making it convenient to connect the lamp arm 31. The lamp arm 31 and the turning shaft 22 are rotationally connected within a range of 90 degrees, so that the lamp arm 31 is perpendicular to the rod body 21 when opened, and parallel to the rod body 21 when closed. When closed, the rod body 21, turning shaft 22, lamp arm 31, and block structure 11 of the bracket 2 form a rectangle shape, and the appearance is simple and beautiful.

Based on the above desk lamp structure, the mode selection module 51 may have the following structure. In the first embodiment, referring to FIG. 1 and FIG. 2, the mode selection module 51 includes a sensor 511 provided on the lamp arm 31 and a module selection unit 512 connected to the sensor 511. The module selection unit 512 is a circuit module, which can be set in the above-mentioned block structure 11. The sensor 511 can use a gravity sensor, an angular velocity sensor, a Hall sensor, an ultrasonic sensor or an infrared sensor, etc. Any sensor 511 which can sense the position of the lamp arm 31 so as to determine the open state or the closed state would suffice. When the lamp arm 31 is sensed to be turned on, the module selection unit 512 connected to it controls the desk lamp to enter the second mode (such as bright light mode). When the lamp arm 31 is sensed to be turn off, the module selection unit 512 controls the desk lamp to enter the first mode (such as night light mode).

Figure 3:
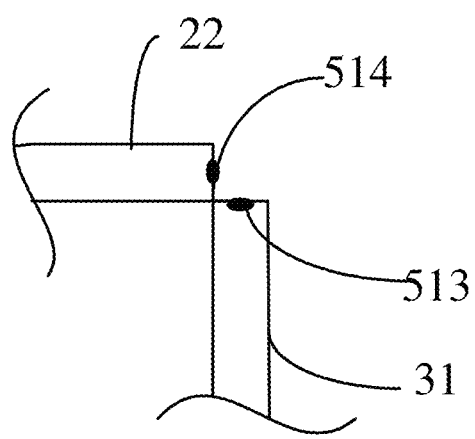
FIG. 3 is a partial structural schematic diagram of a desk lamp when a lamp arm is in the closed state in accordance with the embodiments of the present disclosure.
Figure 4:
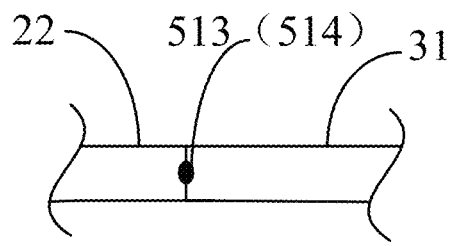
FIG. 4 is a partial structural schematic diagram of a desk lamp when a lamp arm is in the open state in accordance with the embodiments of the present disclosure.

Referring to FIG. 3 and FIG. 4, in the second embodiment, the mode selection module 51 includes a first conductive contact 513 provided at the end of the lamp arm 31 and a second conductive contact 514 provided at the end of the bracket 2, and a module selection unit 512 electrically connected to the second conductive contact 514. When the lamp arm 31 is in the open state, the first conductive contact 513 is conductive with the second conductive contact 514, and the corresponding signals are received by the module selection unit 512 to control the desk lamp to enter the second mode (such as the bright light mode). When the lamp arm 31 is in the close state, the first conductive contact 513 is cut off from the second conductive contact 514, and the corresponding signals are received by the module selection unit 512 to control the desk lamp to enter the first mode (for example, night light mode).

Figure 5:
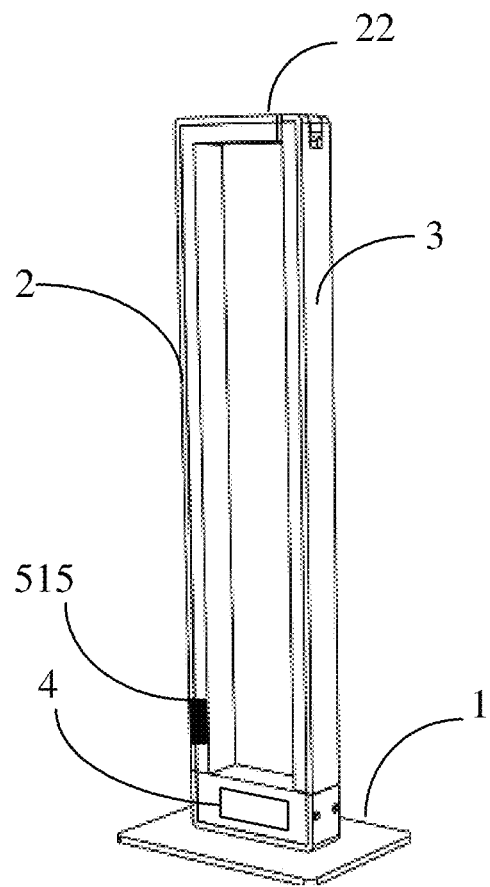
FIG. 5 is a structural schematic diagram of a desk lamp provided with a light sensor in accordance with the embodiments of the present disclosure.

The above mode selection module 51 determines the working state of the desk lamp based on the state of the lamp arm 31. In order to prevent the night lamp mode from being turned on when the lamp arm 31 of the desk lamp is open at night, a third embodiment may also be adopted. Referring to FIG. 5, in a third embodiment, the mode selection module 51 includes a light sensor 515 and a module selection unit 512 electrically connected to the light sensor 515. The light sensor 515 is used to sense the brightness of the ambient light and can be set on base 1, bracket 2, or lamp body 3. When the brightness of the ambient light is not lower than the preset threshold, the module selection unit 512 controls the desk lamp to enter the second mode (such as bright light mode). When the brightness of the ambient light is lower than the preset threshold, the module selection unit 512 controls the desk lamp to enter the first mode (such as night light mode). This mode selection module 51 is not limited by the state of the lamp arm 31, and only switches the working state based on the brightness of the ambient light, which has better adaptability.

It should be understood that the above provides three embodiments of the bright light mode and night light mode for enabling the desk lamp, but the present disclosure is not limited to the above three modes. When the desk lamp is in a certain working state, on the basis of realizing long-distance touch and short-distance touch, the specific gesture, brightness, and color temperature correspondence methods are not limited to the methods provided above, and the shape of the desk lamp is not limited to the above-mentioned shape.

The above description only refers to the preferred embodiments of the present disclosure, and is not intended to limit the present disclosure. Any modification, equivalent replacement, and improvement made within the spirit and principle of the present disclosure shall be included within the protection range of the present disclosure.

What is claimed is:

1. A desk lamp, comprising
    a base,
    a bracket connected to the base,
    a lamp body connected to the bracket,
    a flexible touch screen provided on the base, the bracket, or the lamp body, and
    a control device operative to control the desk lamp to enter a working mode and operate in the working mode;
    wherein the working mode comprises at least a first mode and a second mode; when the desk lamp is in the first mode, the control device controls the flexible touch screen to sense a first distance touch by human body; when the desk lamp is in the second mode, the control device controls the flexible touch screen to sense a second distance touch by human body.

2. The desk lamp according to claim 1, wherein the control device comprises a mode selection module and a work control module; the mode selection module is operative to enable a first mode or a second mode of the desk lamp; and the work control module is operative to control the desk lamp to work in the first mode or the second mode.

3. The desk lamp according to claim 2, wherein the first distance touch comprises a long-distance floating touch, a short-distance floating touch, and a contact touch; or, the first distance touch comprises the long-distance floating touch and the short-distance floating touch;
    wherein the second distance touch comprises the short-distance floating touch and the contact touch.

4. The desk lamp according to claim 3, wherein the flexible touch screen is a capacitive touch screen, and the floating touch senses a touch action by detecting a change in a capacitance value of the capacitive touch screen; a detection sensitivity in the first mode is a first sensitivity; a detection sensitivity in the second mode is a second sensitivity, and the first sensitivity is higher than the second sensitivity.

5. The desk lamp according to claim 4, wherein the first mode is a night light mode; the second mode is a bright light mode; and the lamp body is lighted in a low light form in the night light mode, and in a bright light form in the bright light mode.

6. The desk lamp according to claim 2, wherein the flexible touch screen is connected to the work control module, and the work control module, according to a detection result of the first distance touch and the second distance touch by the flexible touch screen, controls a light state comprising light on and off, light brightness, and color temperature.

7. The desk lamp according to claim 2, wherein the work control module controlling the desk lamp to work in the first mode comprises the following steps:
S101: scanning a touch signal within a first distance by the flexible touch screen; when the touch signal is scanned, performing S102; when the touch signal is not scanned, repeating S101;
S102: controlling the lamp body to light to emit a first state light.

8. The desk lamp according to claim 7, further comprising the following steps after S102:
S103: scanning the touch signal within a second distance by the flexible touch screen, the second distance lower than the first distance; when the touch signal is scanned, performing S104; when the touch signal is not scanned, repeating S103;
S104: changing the light brightness of the lamp body to a second state light.

9. The desk lamp according to claim 8, wherein in S103, when the touch signal is not scanned, whether scans have been performed for a predetermined number is determined; if yes, the light is turned off, otherwise S103 is repeated.

10. The desk lamp according to claim 8, further comprising S105 after S104: adjusting the light brightness and/or the color temperature according to a gesture action sensed by the flexible touch screen.

11. The desk lamp according to claim 10, wherein the adjusting light brightness and/or the color temperature according to the gesture action sensed by the flexible touch screen comprises: adjusting the light brightness and/or the color temperature according to one-finger movement, one-finger pausing, two-finger movement, and two-finger pausing sensed by the flexible touch screen.

12. The desk lamp according to claim 2, wherein the work control module controlling the desk lamp to operate in the second mode comprises:
S201: scanning a touch signal within a second distance by the flexible touch screen; when the touch signal is scanned, performing S202; when the touch signal is not scanned, repeating S201;
S202: controlling the lamp body to emit a third state light.

13. The desk lamp according to claim 12, further comprising S203 after S202: adjusting the light brightness and/or the color temperature according to a gesture action sensed by the flexible touch screen.

14. The desk lamp according to claim 2, wherein the lamp body comprises a lamp arm and a light-emitting element provided on the lamp arm; the bracket comprises a rod body vertically disposed on the base and a turning shaft bent from a top end of the rod body; the lamp arm is rotatably connected to the bracket by the turning shaft, so that the lamp arm is in an open state or a closed state relative to the bracket.

15. The desk lamp according to claim 14, wherein the lamp arm is rotatably connected to the turning shaft within a range of 90 degrees, so that the lamp arm is perpendicular to the rod body in the open state and is parallel to the rod body in the closed state.

16. The desk lamp according to claim 14, wherein the mode selection module comprises a sensor provided on the lamp arm and a module selection unit connected to the sensor; the sensor is operative to sense the open state or the closed state of the lamp arm; when the lamp arm is sensed to be in the closed state, the module selection unit controls the desk lamp to enter the first mode; when the lamp arm is sensed to be in the open state, the module selection unit controls the desk lamp to enter the second mode.

17. The desk lamp according to claim 14, wherein the mode selection module comprises a first conductive contact provided on one end of the lamp arm, a second conductive contact provided on one end of the bracket, and a mode selection unit electrically connected with the second conductive contact; when the lamp arm is in the open state, the first conductive contact is conductive with the second conductive contact, and the module selection unit controls the desk lamp to enter the second mode; and when the lamp arm is in the closed state, the first conductive contact is not conductive with the second conductive contact, and the module selection unit controls the desk lamp to enter the first mode.

18. The desk lamp according to claim 2, wherein the mode selection module comprises a light sensor and a module selection unit electrically connected to the light sensor, and the light sensor is operative to sense the brightness of ambient light; when the brightness of the ambient light is lower than a preset threshold, the module selection unit controls the desk lamp to enter the first mode; when the brightness of the ambient light is not lower than the preset threshold, the module selection unit controls the desk lamp to enter the second mode.

19. The desk lamp according to claim 1, wherein the sensing section of the flexible touch screen is a $4\pi$ solid angle space centered on the sensing portion of the flexible touch screen.

* * * * *